United States Patent
Jung et al.

(10) Patent No.: US 8,032,941 B2
(45) Date of Patent: Oct. 4, 2011

(54) METHOD AND APPARATUS FOR SEARCHING FOR RIGHTS OBJECTS STORED IN PORTABLE STORAGE DEVICE OBJECT IDENTIFIER

(75) Inventors: Sang-sin Jung, Seoul (KR); Yun-sang Oh, Seoul (KR); Moon-sang Kwon, Seoul (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1161 days.

(21) Appl. No.: 11/226,265

(22) Filed: Sep. 15, 2005

(65) Prior Publication Data

US 2006/0059351 A1    Mar. 16, 2006

(30) Foreign Application Priority Data

Sep. 16, 2004  (KR) .................. 10-2004-0074133

(51) Int. Cl.
*G06F 7/04* (2006.01)
*H04N 7/167* (2006.01)
(52) U.S. Cl. .......................... 726/27; 380/201
(58) Field of Classification Search .......... 380/200, 380/201; 713/168, 171; 726/27
See application file for complete search history.

(56) References Cited

U.S. PATENT DOCUMENTS

| | | | |
|---|---|---|---|
| 6,968,059 B1 * | 11/2005 | Kimura | 380/201 |
| 7,216,368 B2 * | 5/2007 | Ishiguro | 726/32 |
| 7,522,675 B2 * | 4/2009 | Sheynman et al. | 375/295 |
| 2003/0007640 A1 * | 1/2003 | Harada et al. | 380/270 |
| 2004/0003398 A1 * | 1/2004 | Donian et al. | 725/34 |
| 2005/0144140 A1 * | 6/2005 | Nagao | 705/59 |
| 2005/0207575 A1 * | 9/2005 | Okamoto | 380/201 |

FOREIGN PATENT DOCUMENTS

| | | |
|---|---|---|
| KR | 2002-0016551 A | 3/2002 |
| KR | 2002-0020104 A | 3/2002 |
| KR | 10-2004-0077535 A | 9/2004 |
| WO | WO 99/18507 A1 | 4/1999 |
| WO | WO 00/00889 A2 | 1/2000 |

* cited by examiner

*Primary Examiner* — Eleni Shiferaw
*Assistant Examiner* — Ali Abyaneh
(74) *Attorney, Agent, or Firm* — Sughrue Mion, PLLC

(57) ABSTRACT

A method for searching a portable storage device for a rights object by using an identifier of the rights object, including a host device accessing the portable storage device, retrieving the identifier of the stored rights object from the portable storage device, storing the retrieved object identifier, searching for the stored object identifier to perform an operation associated with the rights object stored in the portable storage device, and acquiring location data of the rights object as a result of the searching.

35 Claims, 10 Drawing Sheets

| 531 | 532 | 533 | 530 | | | |
|---|---|---|---|---|---|---|
| 1 | ID 1, 1 | ID 1, 2 | ID 1, 3 | ID 1, 4 | ... | ID 1, N |
| 2 | ID 2, 1 | ID 2, 2 | ID 2, 3 | ID 2, 4 | ... | ID 2, N |
| 3 | ID 3, 1 | ID 3, 2 | ID 3, 3 | ID 3, 4 | ... | ID 3, N |
| ... | ... | ... | ... | ... | ... | ... |
| M | ID M, 1 | ID M, 2 | ID M, M | ID M, 4 | ... | ID M, N |

| LOCATION | RIGHTS OBJECT STORED | CONTENT IDENTIFIER | RIGHTS OBJECT IDENTIFIER | CONTENT PROVIDER | IDENTIFIER 4 | ... | IDENTIFIER N | METAFIELD |
|---|---|---|---|---|---|---|---|---|
| 1 | OBJECT 1 | Hash(1058) | Hash(RID_837) | Hash(BEETHOVEN) | ID 1, 4 | ... | ID 1, N | 0 |
| 2 | OBJECT 2 | Hash(132) | Hash(RID_5396393) | Hash(STING) | ID 2, 4 | ... | ID 2, N | 0 |
| 3 | OBJECT 3 | Hash(7985214) | Hash(RID_39741) | Hash(BEATLES) | ID 3, 4 | ... | ID 3, N | 0 |
| ... | ... | ... | ... | ... | ... | ... | ... | ... |

METHOD AND APPARATUS FOR SEARCHING FOR RIGHTS OBJECTS STORED IN PORTABLE STORAGE DEVICE OBJECT IDENTIFIER

CROSS-REFERENCE TO RELATED APPLICATIONS

This application claims priority from Korean Patent Application No. 10-2004-0074133 filed on Sep. 16, 2004 in the Korean Intellectual Property Office, the entire disclosure of which is incorporated herein by reference.

BACKGROUND OF THE INVENTION

1. Field of the Invention

Apparatuses and methods consistent with the present invention relate to searching for rights objects stored in a portable storage device using an object identifier.

2. Description of Related Arts

Recently, digital rights management (DRM) is being actively researched, developed, and used in commercial services. DRM needs to be used in commercial services because of the following various characteristics of digital content. Unlike analog data, digital content can be easily copied without loss, reused, processed and distributed. However, large amounts of money, labor, and time are needed to produce digital content. When the digital content is copied and distributed without permission, the producer of the digital content loses profit, and the motivation to produce is reduced. As a result, the development of digital content businesses may be hampered.

Several efforts have been made to protect digital content. Conventionally, digital content protection has concentrated on preventing non-permitted access to digital content, and permitting only people who have paid fees to access the digital content. However, when a person who has paid the fees intentionally distributes the digital content to other people, these people can use the digital content without paying. To solve this problem, DRM was introduced. In DRM, anyone is allowed to freely access encrypted digital content, but a license, referred to as a rights object, is needed to decrypt and execute the digital content. Accordingly, the digital content can be more effectively protected by using DRM, as compared to the conventional method.

A portable storage device is a connectable/disconnectable device such as a portable phone, a computer, or a digital camera that is portable and that can store data of various types. The portable storage device includes a storage space for storing data, and a portion performing operations and control. A multimedia card (MMC) is a portable storage device which stores multimedia data to be used for various types of digital equipment, overcoming limitations of conventional hard disks and compact disks. The MMC also includes an operational unit that is not included in conventional storage media, thereby having the ability to perform control. Recently, a security function was added to the MMC, thereby developing a secure MMC that protects the digital content from being copied during storage and transmission. With the development of the secure MMC, rights management of digital content has become possible. Hereinafter, digital equipment such as a digital camera, a portable phone, a computer and a digital camcorder will be collectively referred to as a "host device."

Recently, memory cards including a flash memory have become popular portable storage devices. They differ from a dynamic random access memory (DRAM) and a synchronization random access memory (SRAM) in that they can maintain data without a supply of power. However, a disadvantage of these devices is that they are slower at reading and writing data than DRAMs and SDRAMs.

A rights object stored in a portable storage device is information to be referenced whenever content is reproduced, which requires repetitive reading, writing and modifying operations. To effectively perform these repetitive operations, it is necessary to reduce time consumed in searching for a specific rights object.

A conventional method of providing a cache function through an SRAM to thereby increase input/output speeds of a memory card has been presented in Korean Unexamined Patent Publication No. 10-2002-0020104. In the conventional method, the SRAM is initialized when the memory card is connected to a digital device and thereafter functions as a cache memory storing specific data therein during read and write operations, thereby increasing input/output speed.

The conventional method may increase the input/output speed when searching for data that has been previously searched for, but it cannot decrease the inherent delay caused in data searching.

In particular, since the portable storage device storing rights objects therein under the DRM system repeatedly performs input/output operations for a specific rights object and searches for rights objects, there is a need for a method to improve the speeds of the inputting, outputting, and searching operations.

SUMMARY OF THE INVENTION

In accordance with an aspect of the present invention, there is provided a method for increasing the speed of using an object stored in a portable storage device by promptly searching for the object.

In accordance with another aspect of the present invention, there is provided a method for obtaining location data of an object within a portable storage device using identifier information of the object.

According to an aspect of the present invention, there is provided a method for searching a portable storage device for a rights object by using an identifier of the object, the method comprising: a host device accessing the portable storage device, retrieving the identifier of the stored object from the portable storage device, storing the retrieved object identifier, searching for the stored object identifier to perform an operation associated with the object stored in the portable storage device, and acquiring location data of the object as a result of the searching.

According to an aspect of the present invention a method for searching for a rights object in a portable storage device by using an object identifier, the method comprising: a portable storage device accessing a host device, transmitting an identifier of an object stored in a storage unit to the host device, receiving location data of the object and operation data of the object from the host device.

According to an aspect of the present invention an apparatus for searching for a rights object in a portable storage device by using an identifier of an object in a host device, the apparatus comprising, an object identifier storing unit which stores object identifiers therein, and an application unit which retrieves an object identifier from the portable storage unit and stores the object identifier in the object identifier storing unit, wherein the application unit searches for the stored object identifier and acquires location data of the stored object to perform an operation with respect to the object stored in the portable storage device.

According to an aspect of the present invention a portable storage device comprising, an object data storing unit for storing objects and object identifiers therein, an application unit for transmitting an object identifier to a host device and receiving location data of the object and operation data associated with the object from the host device, wherein the application unit directly accesses the object data storing unit using the received location data of the object.

BRIEF DESCRIPTION OF THE DRAWINGS

The above and other aspects of the present invention will become better understood with regard to the following description of the exemplary embodiments given in conjunction with the accompanying drawings, in which.

DETAILED DESCRIPTION OF EXEMPLARY EMBODIMENTS OF THE INVENTION

The terms used throughout the specification are defined as follows.

A "host device" refers to a device using a rights object stored in a portable storage device connected to the portable storage device. The host device includes portable multimedia devices such as a mobile phone and a personal digital assistant (PDA), and multimedia devices such as a computer and a digital television. The host device is commonly called a device or a host.

A "portable storage device" includes a storage medium having non-volatile memory such as a flash memory, which is available for reading, writing and erasing. By way of example, the portable storage device can be smart media, a memory stick, a compact flash (CF) card, an extreme digital (XD) card, a multimedia card, and a universal serial bus (USB) storage device. The portable storage device will be explained based on a secure MMC hereinafter.

A "rights object" is information about the copyright of digital content, under which rights to play, display, execute, print, export (copy and move), and peruse digital content are established. For performing DRM between the host device and the portable multimedia device, it is necessary to use the rights object containing therein information as to whether any right associated with the digital content has been granted. An object in the specification may refer to the rights object. When the rights object is large, it may be divided into a plurality of parts in a predetermined format, each of which may be a rights object.

An "object data storing unit" stores the objects therein. Also, the object data storing unit stores identification data for finding an object and it may store location data of the object. The object data storing unit may store the above mentioned data in various forms. An exemplary embodiment of the present invention will be described, assuming that the above mentioned data are stored in a table format in the object data storing unit. An object table (described later) constitutes an exemplary embodiment of the present invention, to which the scope of the present invention will not be limited.

The object table includes rights objects and data about objects such as location data, identification (or identifier) fields and metadata. The location data represents a location in the object data storing unit where the rights object is stored. By using the location data, the objects stored in the portable storage unit may be read and written.

The metadata includes state information of the object that is necessary to store the object, and an object mapping table that stores the states of the objects stored in the object table.

An "object identifier" is a reference for identifying a specific object when searching. There may exist a plurality of identifiers, or identification data for a single object. For example, in a case of an object storing therein rights of specific content, a content identifier (content ID), the name of the content producer, or a producer identifier may be used as the of object identifier. The object identifier may also be used for determining whether an object provides the rights of playing, copying or moving the corresponding content. Furthermore, with an identifier or identification data containing information about the usage term, objects whose usage term has been expired can be searched for. The identification of an object is used when searching for an object that satisfies concerned conditions without analyzing the object. That is, the object identifiers are required when searching for objects, and these identifiers can be defined in many ways. A rights object identifier (Rights Object ID) assigned to each object may also be used as an identification of the object.

An "object identifier storing unit" stores the object identifiers described above. It is used when a host device using a rights object stored in a portable storage device stores an object identifier. Hereinafter, an object identifier table is used as an example of an object identifier storing unit, to which the scope of the present invention will not be limited. The object identifier table is created through mapping the host device and the portable storage device, and it may include location data of an object.

An "object mapping data storing unit" represents states of objects stored in the object data storing unit. For example, if it is constructed with consecutive bits, the object mapping data storing unit will represent only whether the object has been stored therein. However, the object mapping data storing unit constructed in a table format can store more data therein. In the present invention, the object mapping data storing unit is implemented in a table format, to which the present invention will not be limited. The table format of the object mapping data storing unit is called an "object mapping table" hereinafter.

The host device and the portable storage unit may be connected through a wired or wireless communication link. The present invention covers a wireless connection of the host device with the portable storage device. This implies that data is transmitted and received between the host device and the portable storage device through both a wired link and a wireless link. That is, access or connection is not limited to a physical connection between the host device and the portable storage device.

In the exemplary embodiments of the present invention described below, a "part", "unit" or a "module" indicates a software component or a hardware component such as a field-programmable gate array (FPGA) or an application-specific integrated circuit (ASIC). The part, unit or module performs a particular function but is not restricted to hardware. The part, unit or module may be included in an addressable storage medium or it may be configured to play one or more processors. Accordingly, parts, units or modules may include components such as software components, object-oriented software components, class components, task components, processes, functions, attributes, procedures, subroutines, segments of a program code, drivers, firmware, microcode, circuits, data, databases, data structures, tables, arrays, and parameters. Components and features provided by the parts, units or modules may be combined into a smaller number of components and modules, or they may be divided into a greater number of components and modules. In addition, components, and parts, units or modules, may be implemented such that they are executed by one or more central processing units (CPUs) in a device or a secure MMC.

Hereinafter, exemplary embodiments of the present invention will be described in more detail with reference to the accompanying drawings.

Figure 1:
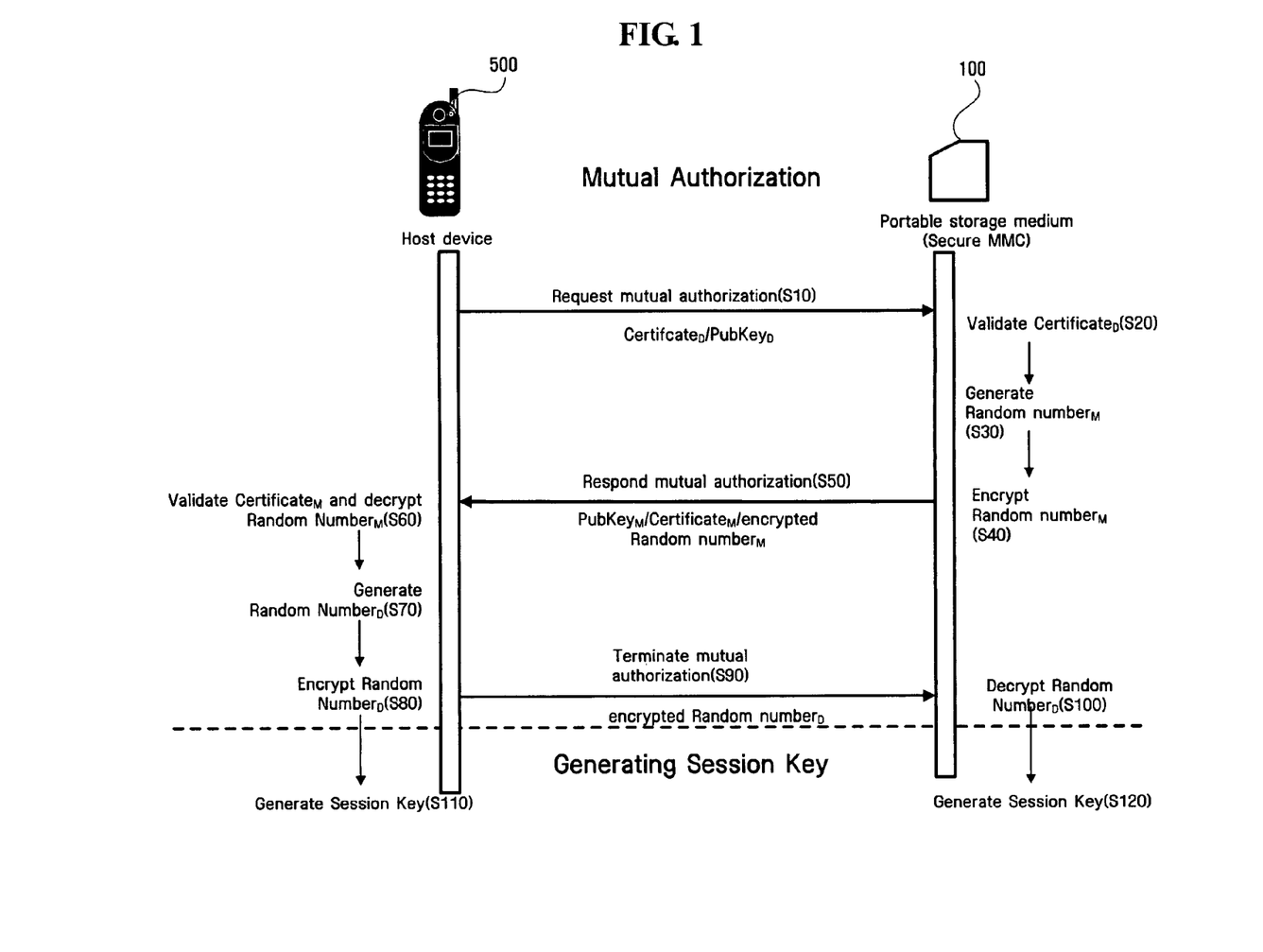
FIG. 1 is a diagram showing mutual authorization in accordance with an exemplary embodiment of the present invention.

FIG. 1 is a diagram showing mutual authorization in accordance with an exemplary embodiment of the present invention. Mutual authorization will be described based on a secure multimedia card 100, which is an exemplary embodiment of a portable storage device, with respect to FIG. 1. In the mutual authorization, a host device 500 and the secure multimedia card 100 verify whether they are authorized and exchange random numbers which are used for generating session keys. In FIG. 1, a command to request a counterpart device to perform an operation is indicated above each horizontal arrow, and a parameter according to this command or data to be transmitted is indicated below each horizontal arrow. In the exemplary embodiment of the present invention, all the commands for mutual authorization are transferred by the host device 500 to the secure multimedia card 100, and the secure multimedia card 100 performs the operation corresponding to the command transferred from the host device 500. For example, when the host device 500 transfers a command to respond to a mutual authorization to the secure multimedia card 100, the secure multimedia card 100 receives the command and then transmits a certificate M and an encrypted random number M to the host device 500. In another exemplary embodiment of the present invention, both the host device 500 and the secure multimedia card 100 may issue commands. In this case, the secure multimedia card 100 may transmit the certificate M and the encrypted random number M to the host device 500 when responding to the mutual authorization. Hereinafter, the mutual authorization will be described in detail.

First, the host device 500 requests the secure multimedia card to perform a mutual authorization in operation S10. When requesting the mutual authorization, the host device 500 also transfers a device public key (PubKey$_D$) to the secure multimedia card 100. In an exemplary embodiment of the present invention, a device certificate (Certificate$_D$) issued to the host device 500 from a certification authority is transmitted to the secure multimedia card 100 with the device public key (PubKey$_D$) in operation S10. The device certificate (Certificate$_D$) includes a device ID, the public key (PubKey$_D$) and an electronic signature of the certification authority. Based on the received device certificate (Certificate$_D$), the secure multimedia card 100 determines whether the host device 500 is authorized and obtains the device public key (PubKey$_D$).

The secure multimedia card 100 determines the validity of the device certificate (Certificate$_D$) by using a certificate revocation list (CRL) in operation in operation S20. If the host device 50 is included in the CRL, the secure multimedia card 100 refuses the request for mutual authorization from the host device 500. If the host device 50 is not included in the CRL, the secure multimedia card 100 obtains the device public key (PubKey$_D$) through the device certificate (Certificate$_D$).

Thereafter, the secure multimedia card 100 generates a random number M in operation S30. The generated random number M is encrypted using the device public key (PubKey$_D$) in operation S40. Then, the secure multimedia card 100 receives a command to respond to a mutual authorization from the host device 500 or otherwise and transmits a command to respond to a mutual authorization to the host device 500 in operation S50. In responding to the mutual authorization, the secure multimedia card 100 transmits a public key (PubKey$_M$) of the secure multimedia card and an encrypted random number M to the host device 500. In an exemplary embodiment, a certificate (Certificate$_M$) of the secure multimedia card may be transmitted instead of the public key (PubKey$_M$) of the secure multimedia card. In another exemplary embodiment, the secure multimedia card 100 transmits the certificate (Certificate$_M$) of the secure multimedia card, the encrypted random number M and an electronic signature (Sig$_M$) of the secure multimedia card to the host device 500.

The host device 500 receives the certificate (Certificate$_M$) of the secure multimedia card and the encrypted random number M, determines whether the secure multimedia card 100 is authorized by using the certificate (Certificate$_M$), obtains the public key (PubKey$_M$) of the secure multimedia card, and obtains the random number M by decrypting the encrypted random number M into a device private key (PrivKey$_D$) in operation S60. The host device 500 then generates a random number D in operation S70 and encrypts the random number D to generate a public key (PubKey$_M$) of the secure multimedia card in operation S80. Thereafter, termination of mutual authorization is performed in operation S90. In the termination of mutual authorization, the host device 500 transmits the encrypted random number D to the secure multimedia card 100. In the exemplary embodiment of the present invention, the host device 500 transmits to the secure multimedia card 100 the electronic signature (Sig$_D$) of the host device with the encrypted random number D.

The secure multimedia card 100 receives the encrypted random number D and decrypts it in operation S100. Accordingly, the host device 500 and the secure multimedia card 100 both know the random numbers they generated. In the exemplary embodiment, since random numbers are generated and used by both the host device 500 and the secure multimedia card 100, better random number generation is possible, and thus, secure mutual authorization is possible. That is, even if one of the host device 500 and the secure multimedia card 100 generates a number that is not random, randomness can be supplemented by the other thereof.

Figure 2:
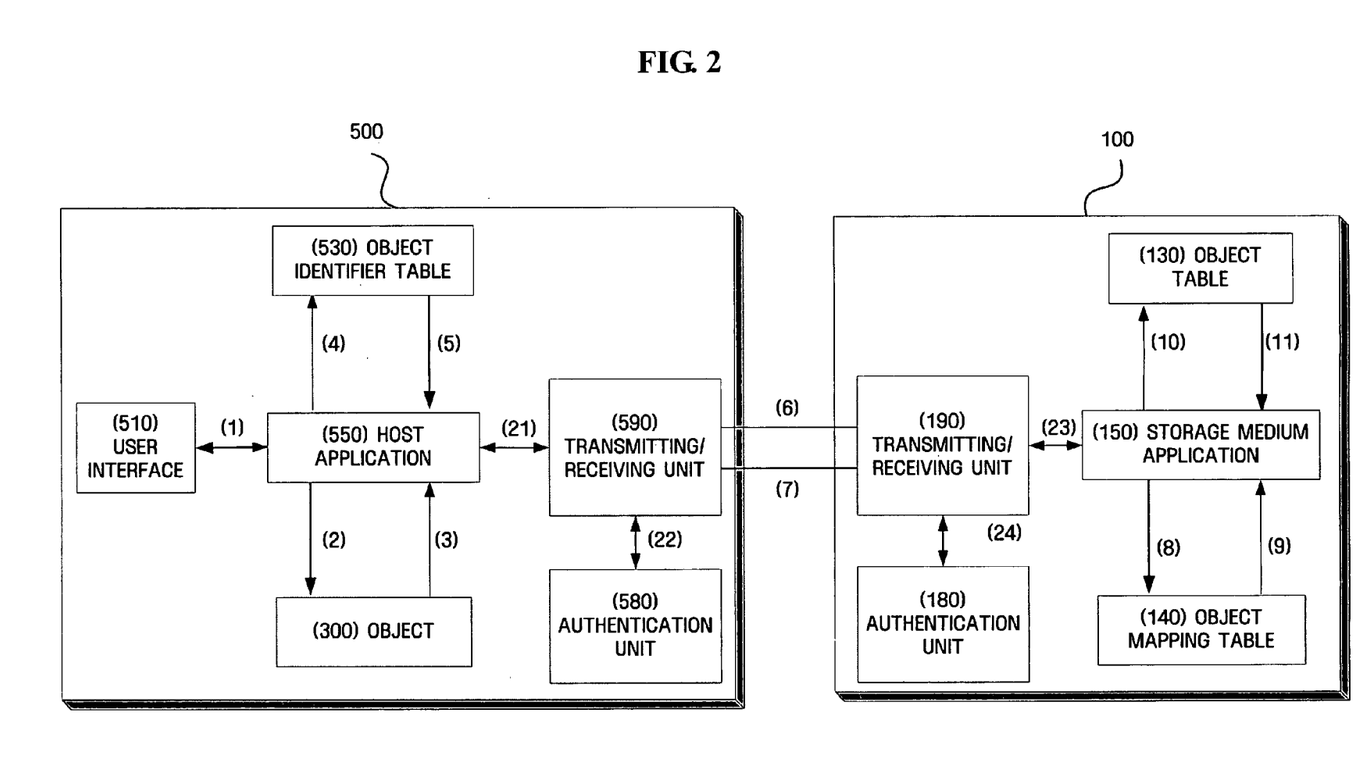
FIG. 2 is a block diagram illustrating respective constructions of a host device and a portable storage device, and an interaction therebetween, in accordance with an exemplary embodiment of the present invention.

FIG. 2 is a block diagram illustrating a construction and an interconnection of a host device and a portable storage device in accordance with an exemplary embodiment of the present invention.

In FIG. 2, the host device 500 and the portable storage device 100 are interconnected through a communication link. The communication link includes a wired communication link and a wireless communication link.

The host device 500 includes a user interface (or an interface unit) 510, a host application (or a host application unit) 550, a transmitting/receiving unit 590, and an authorization unit 580. The host device 500 provides an interface to a user for receiving a command from the user and outputting the result of the command to the user by using the user interface 510. The user instructs the host device 500 to reproduce, copy or move predetermined multimedia content through the user interface 510. Accordingly, information to reproduce, copy or move rights objects is required. The host application 550 performs operations using the object identifier table 530, which refers to the object (or object identifier storing unit) 300 stored in the host device 500, or it requests information about a rights object from the portable storage device 100. The transmitting/receiving unit 590 transmits data to or receives data from the portable storage device 100. The authorization unit 580 performs the mutual authorization shown in FIG. 1 and encryption/decryption of data.

The portable storage device 100 includes a storage medium application 150, an object mapping table 140, an object table 130, and an authorization unit 180. The storage medium application 150 performs a read or write operation according to a request from the host device 500. The transmitting/receiving unit 190 transmits data to or receives data from the host device 500 and the authorization unit 180 performs operations for mutual authorization (shown in FIG. 1) and operations for decryption/encryption of data.

Operations of the host device 500 and the portable storage device 100 will be explained in detail with reference to FIG. 2.

When the host device 500 and the portable storage device 100 are interconnected, mutual authorization is performed as shown in FIG. 1. The mutual authorization is performed by the authorization units 180 and 580 respectively in the host device 500 and the portable storage device 100.

After the mutual authorization is completed, the host device 500 and the portable storage device 100 encrypt or decrypt the data to be transmitted or received by using session keys generated during the mutual authorization (operations 22 and 24). And, the host device 500 and the storage medium application 150 exchange the data through the transmitting/receiving units 590 and 190 (operations 21 and 23).

The user interface 510 instructs the host application 550 to perform a specific operation (operation 1).

In response, the host application 550 performs a specific operation such as searching, reading or writing in connection with an object.

The host application 550 has to search for the object, which may be in the host device or the portable storage device.

The host application 550 may directly store an object therein and perform operations to read, write, modify, or delete the object (operations 2 and 3). The host application 550 refers to an application operated in the host device 500 that may require one or more objects simultaneously or consecutively stored in the portable storage device 100.

In addition, the host application 550 uses an object identifier table 530 to obtain information about any object that it lacks (operations 4 and 5), and it requests information about the object or reads the information from the portable storage device 100 (operations 6 and 7).

To obtain information from the host application 550 or perform a requested operation, the storage medium application 150 may write information regarding an object in the object mapping table 140, or modify, delete or read out information from the object mapping table 140 (operations 8 and 9). Furthermore, the host application 550 may perform operations for reading, writing, modifying or deleting the object or object identifier stored in the object table 130 (operations 10 and 11).

If the host application 550 has the object identifier table 530, it may easily obtain the location of the object. However, if the host application 550 has no object identifier table 530, it may request an object identifier table from the portable storage device 100.

The object identifier table allows a user to easily search for the object, and input and output it.

The data exchanged between the host application and the storage medium application of FIG. 2 is encrypted by using the session key generated during mutual authorization (shown in FIG. 1) and then transmitted.

Figure 3:
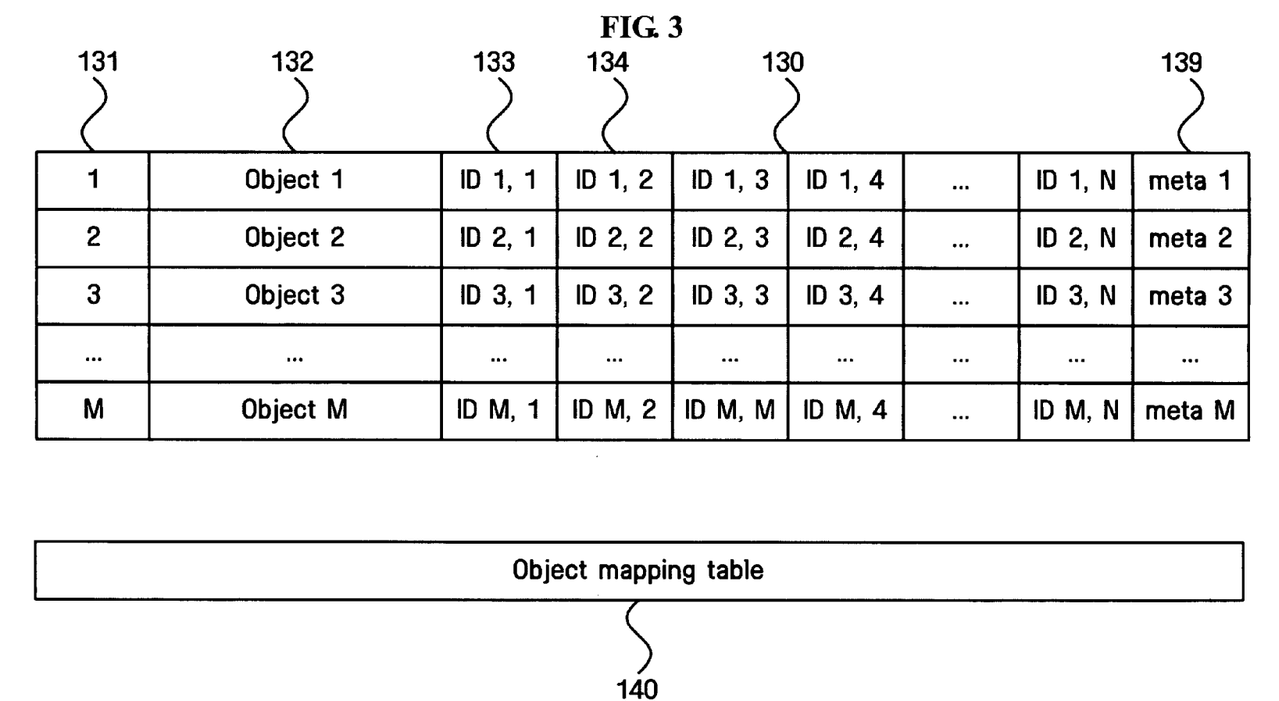
FIG. 3 is a block diagram depicting an object table in accordance with an exemplary embodiment of the present invention.

FIG. 3 is a block diagram illustrating an object table in accordance with an exemplary embodiment of the present invention. The object table includes objects and identifiers required for searching for a predetermined object; and location data of objects may be optionally included in the object table. The object identifiers in the object table may serve as a key for searching for an object. For example, the identification data may include a content identifier (Content ID) representing which content is related to a corresponding object, a content provider identifier (Content Provider ID) representing who is the provider of the content related to the corresponding object and a rights object identifier (Rights Object ID) of the corresponding object. The object identifier may also include more data about the object, and the object can be searched by using the object identifier.

For example, in order to know which rights an object has, there may be an identifier representing a right for playing and another identifier representing a right for copying. Also, the term limit for using the corresponding object may be used as the identifier. When there is plenty of identification data, the host application 500 can search for a predetermined object by using the identification data without accessing the information about the object.

A metadata field 139 has information to represent whether data is stored in the corresponding object, and whether the data has been modified or deleted.

Furthermore, the portable storage device includes an object mapping table to represent whether data about the object table has been modified.

Although the object table includes objects and object identifiers, the objects are not consecutively stored in the object table. Objects may be deleted, and in this case, in lieu of actually deleting one of the objects, information about the deletion of the object is stored in the object mapping table 140, and then a newly added object may be stored in the location where the deleted object resided by using the object mapping table 140. Objects are stored in an object field 132. For example, when the object stored in the fifth row of the object table is to be deleted because the term limit for using it has expired, the object stored in the fifth row of the table may be actually deleted. However, if deletion of the object can be represented by use of the object mapping table, this may decrease the time consumed in deleting the object and its identifier. Also, since the presence of the object can be ascertained through the object mapping table when searching for the object, the likelihood of searching for a deleted object is reduced.

An object location data field 131 represents an address where the object is stored. The object location data field 131 may be omitted. If the objects have predetermined lengths and the object identifiers are produced by a hash function to be the same length, the locations of the objects can be easily calculated. In this case, no object location data is required. The identification data of the objects may be stored to have an identical length by using a hash function. For example, a hash function may be used for allocating eight bytes for the identification in a first field 133 and seven bytes for the identification in a second field 134. Particularly, a cryptographic hash may be used, which converts random data A to a hash value B having a predetermined length. Here, the random data A cannot be analogized by using the hash value B alone. Also, it is impossible to obtain other data C which can be converted to the hash value B by using only the random data A and the hash value B. SHA1, MD4, or MD5 may be used as the cryptographic hash.

The stored object in FIG. 3 may refer to a single rights object or a plurality of assets. When the rights object is divided into plural objects, these assets may be entered in the object table as objects, and a rights object identifier and an asset identification may be entered in an object identifier field.

Also, the identifier is a unique value whose length may vary and whereby an object can be distinguished from other rights objects stored in the same device or other devices or issued in the future. For storing the identifier having variable length in a portable storage device having a limited storage space, it is necessary for the identifier to have a fixed length and be further reduced by using the cryptographic hash. By using the cryptographic hash to store the identifier, security of the data can be highly enhanced. For using the identifier stored through the cryptographic hash, a hash unit for performing the cryptographic hash must be included in the portable storage device and the host device because the host device may search for the object identifier table by converting a predetermined value to a hash value when searching.

Figure 4:
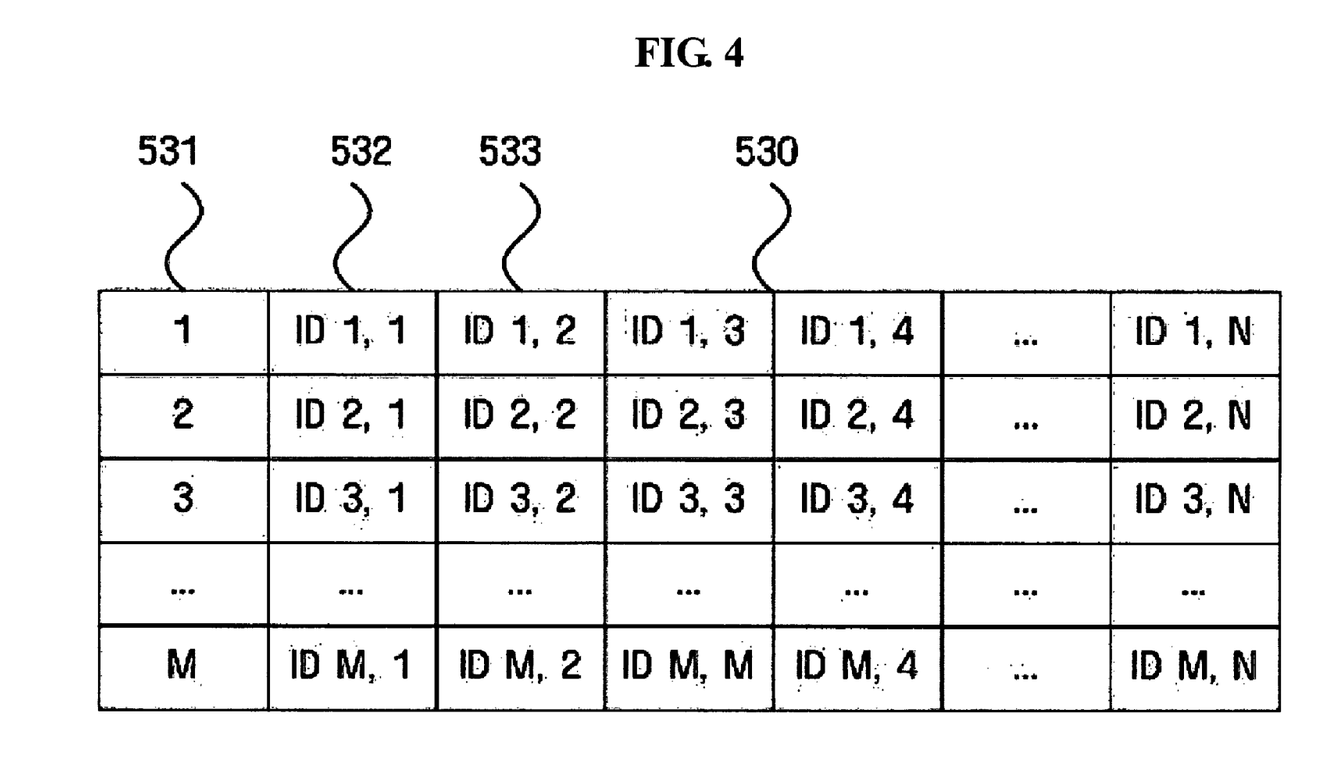
FIG. 4 is a block diagram representing an object identifier table in accordance with an exemplary embodiment of the present invention.

FIG. 4 is a block diagram illustrating a table storing therein object identifiers in accordance with an exemplary embodiment of the present invention.

The object identifier table 530 of FIG. 4 for storing data about object identifiers received from the object table is stored in the host device. The object identifier table 530 stores identifiers therein, excluding objects from the object table, from which an object of a concerned portable storage device can be searched.

Object identifiers are as described in FIG. 3. Object location data 531 is optionally included therein. When the length of an object is a predetermined size, the location of the object can be easily calculated without the object location data. The identifier fields 532 and 533 of the object have identification values according to some specific items.

The host device has the identifier table 530, and may have location data fields of objects. If the lengths of objects are fixed and the lengths of the object identifiers are fixed through a cryptographic hash, the locations of the objects within the portable storage device can be easily calculated; thus, the location data of objects is optionally included. When requesting the portable storage device to perform an operation associated with an object, based on the location data of the object, the operation can be more rapidly performed since the searching time is decreased.

As shown in FIG. 3, the portable storage device includes the object mapping table. Since information about deletion or modification of a corresponding object is maintained in the object mapping table, whether an object has been deleted can be detected before searching for it. Owing to this, the searching time can be decreased.

After the host device and the portable storage device finish mutual authorization, the host device may request the object identifier table of FIG. 4 from the portable storage device, or the portable storage device may provide it to the host device.

FIGS. 5 through 9 are block diagrams illustrating operations according to exemplary embodiments of the present invention. Description of transmitting/receiving units and authentication units of each device will be omitted for the sake of convenience. Data transmitted and received between the host device and the portable storage device is encrypted and transmitted through the authentication units 180 and 580, and the received data is decrypted through the authentication units 180 and 580. Transmission and reception of data are performed by the transmitting/receiving units 190 and 590 of the host device and the portable storage device.

Figure 5:
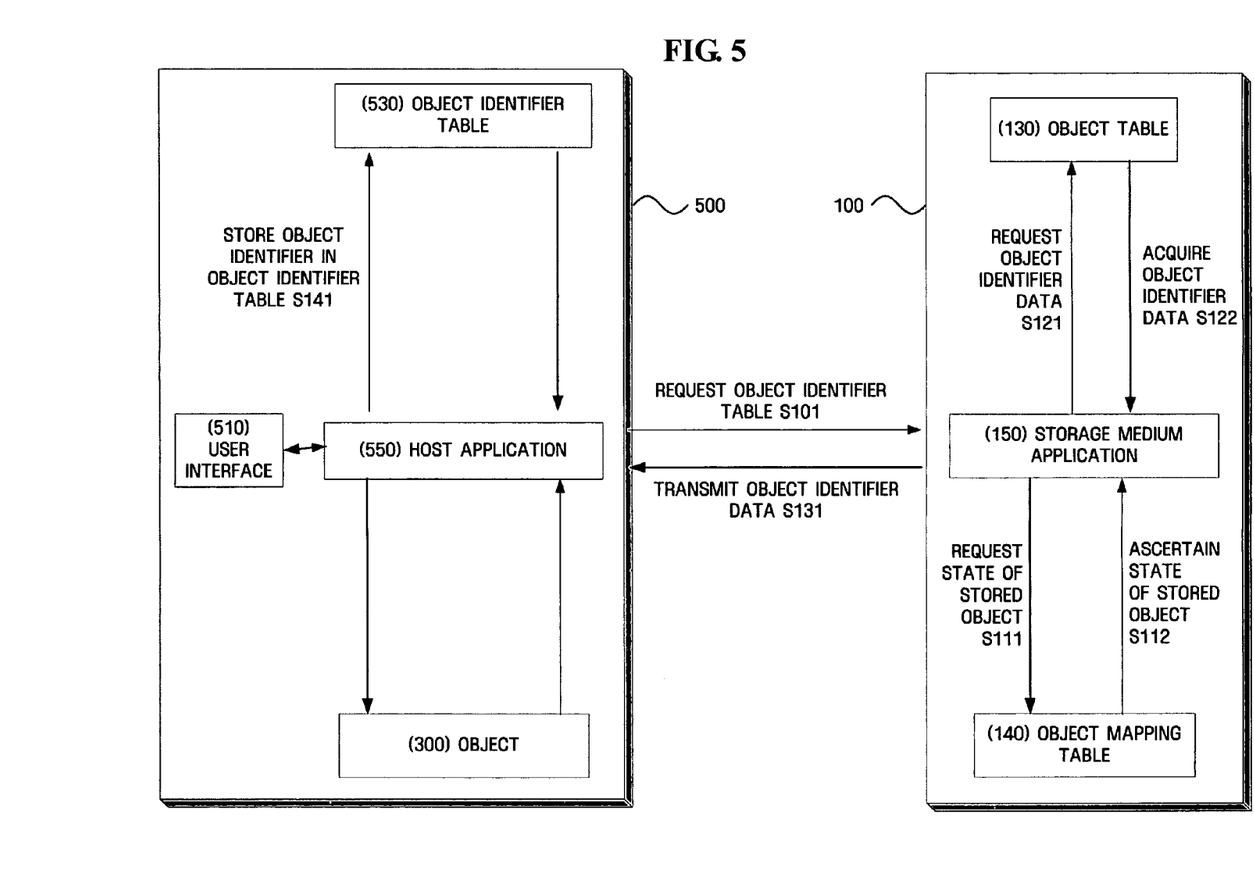
FIG. 5 is a block diagram illustrating creation by a host device of an object identifier table from a portable storage device in accordance with an exemplary embodiment of the present invention.

FIG. 5 is a block diagram illustrating creation by the host device of an object identifier table from the portable storage device according to an exemplary embodiment of the present invention.

The host application 550 (within the host device 500) requests an object identifier table from the storage medium application 150 (operation S101). The storage medium application 150 requests information about the storage state of an object from the object mapping table 140 (operation 5111) and ascertains the storage state of the object (operation S112) because an invalid object may exist or an object may not be stored in the object table due to deletion or modification, or writing of the object has occurred within the object table. For example, assuming that M objects are present in the table and they are arranged in M rows, the M rows are not necessarily stored in a consecutive manner. This may also be caused by the term limit to use the object expiring. Accordingly, the searching time may decrease due to the operation to ascertain the storage state of the object.

Having ascertained the storage state of the object, the storage medium application 150 requests an object identifier data from the object table 130 (operation S121), and acquires the object identifier data from the object table 130 (operation S122). The object identifier is then re-transmitted to the host application 550 (operation S131), and the host application 550 stores the received object identifier in the object identifier table (operation S141). When there is no object identifier table, a new table may be created and then stored.

The request in operation S101 does not imply that a request from the host device is indispensable. Operation S101 is optional. When the host device and the portable storage device are connected in a wireless manner, they can automatically receive the object identifier.

Transmission of an object identifier in operation 5131 is an example of ascertaining the object identifier. By ascertaining the object identifier, the location data of the object can be easily calculated. This is also possible through the location data of the object transmitted along with the object identifier data.

This process is continued until all of the objects stored in the storage medium are read out, or only a part thereof is read out.

Figure 6:
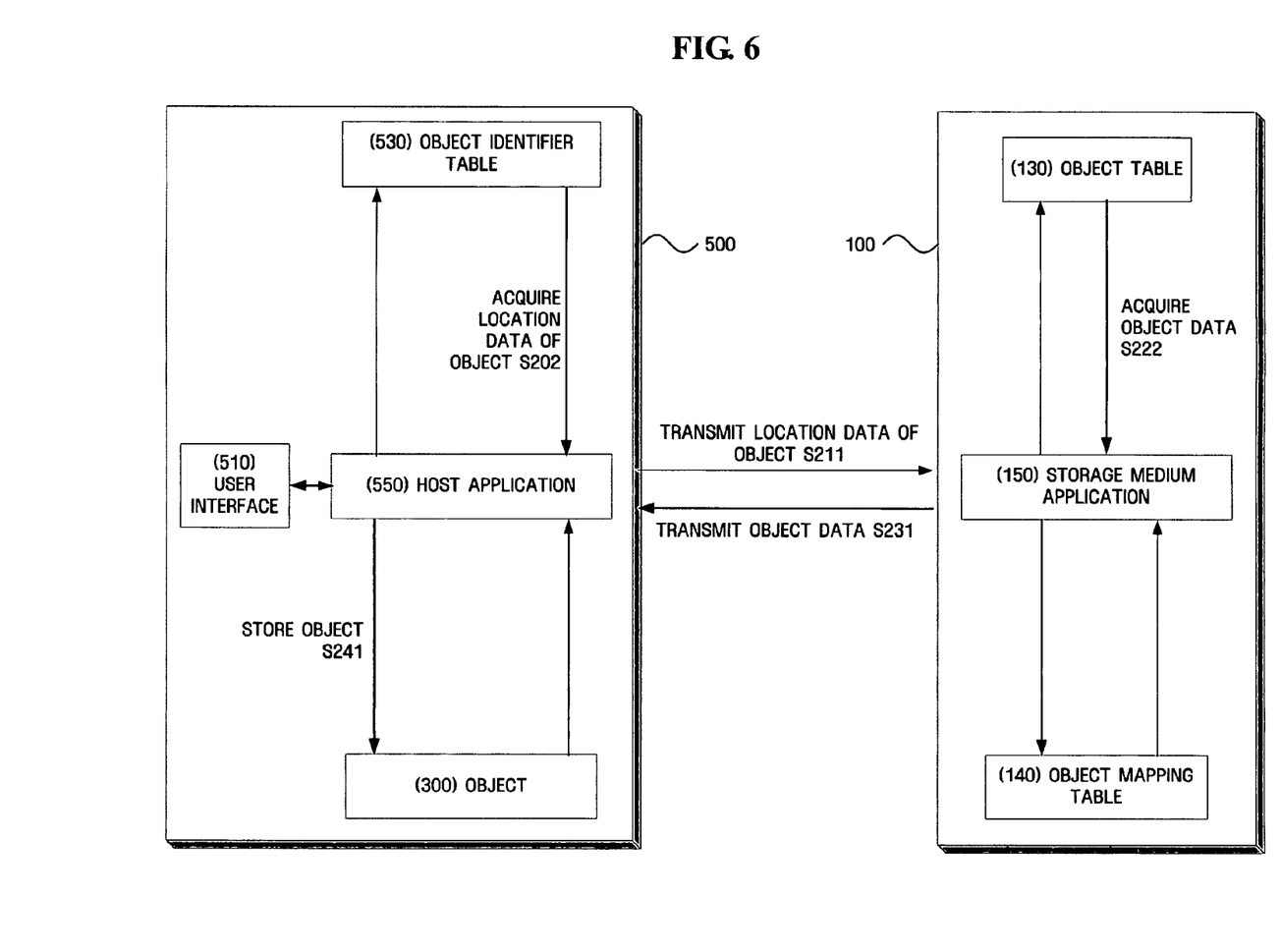
FIG. 6 is a block diagram illustrating reading-out by a host device of an object from a portable storage device in accordance with an exemplary embodiment of the present invention.

FIG. 6 is a block diagram illustrating reading out by the host device of an object from the portable storage device according to an exemplary embodiment of the present invention.

The host application 550 searches the object identifier table 530 before acquiring an object stored in the portable storage device 100. Through this exemplary embodiment of FIG. 5, the host application 550 searches the object identifier table 530 obtained from the portable storage device 100 and obtains the location data of a target object to be read out (operation S202). The host application 550 transmits the location data of the object to the storage medium application (operation S211). At this time, the object identifier data may also be transmitted. The storage medium application 150 acquires the concerned object data by use of the received object location data, without searching for the object table 130 (operation S222), and transmits it to the host application 500 (operation S231).

The host application 550 may reproduce content with the received object or store the object in the storage medium 300 of the host device 500 (operation S241). The rights provided by the object include permissions to copy, move and print in addition to permission to reproduce the content.

Figure 7:
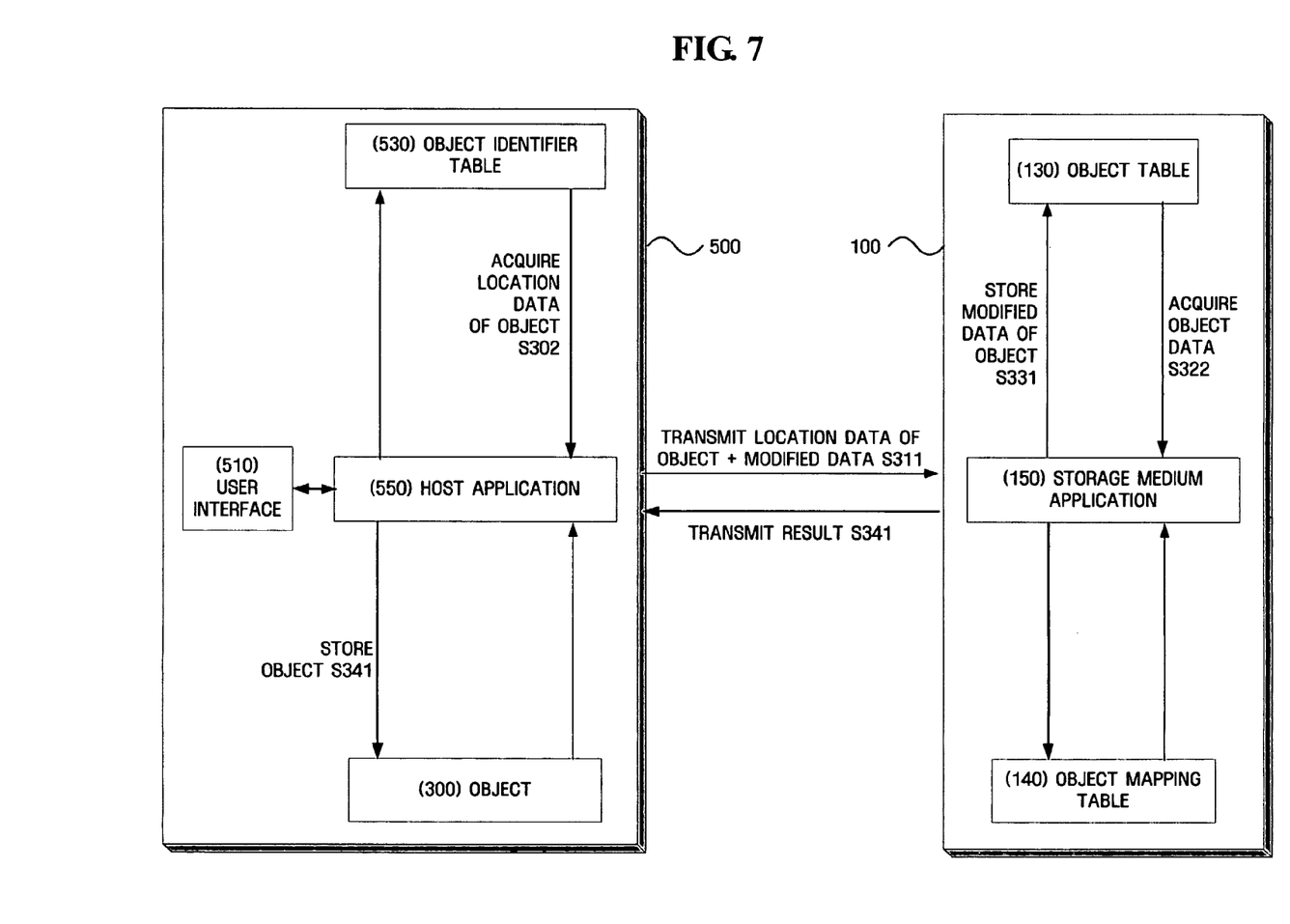
FIG. 7 is a block diagram illustrating modification by a host device of an object acquired from a portable storage device in accordance with an exemplary embodiment of the present invention.

FIG. 7 is a block diagram illustrating modification by the host device of an object acquired from the portable storage device according to an exemplary embodiment of the present invention.

When any change has occurred in an object acquired from the portable storage device 100, the host application 550 may update the object stored in the portable storage device. At this time, the host application 550 obtains the location data of any target object to be read out by searching the object identifier table 530 (operation S302), and transmits the modified data together with the location data of the object in order to apply it to the object (operation S311). The storage medium application 150 obtains the concerned object data directly by use of the received object location data, without searching the object table 130 (operation S322), changes the content of the object and stores the changed content in the object table 130 according to the object location data (operation S331). The storage medium application 150 may optionally transmit the result of this change to the host application 550 (operation S341).

Figure 8:
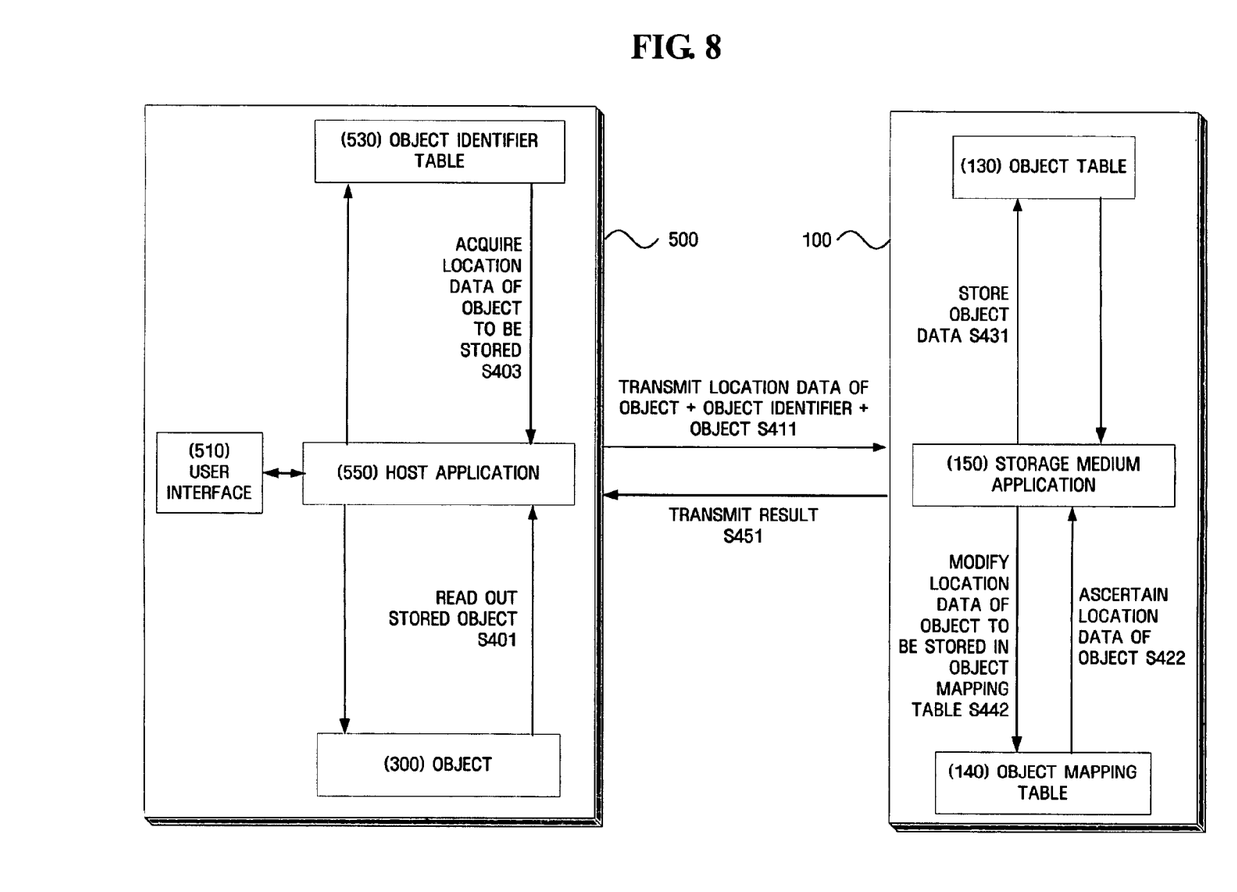
FIG. 8 is a block diagram illustrating storage by a host device of an object in a portable storage device in accordance with an exemplary embodiment of the present invention.

FIG. 8 is a block diagram illustrating storage of the object in the portable storage device by the host device according to an exemplary embodiment of the present invention.

The portable storage device 150 may store, change and use the object mapping table 140. When storing the object, the data stored in the object mapping table 140 is inspected, to thereby easily know the state of the object in use within the object table 150. Even when there is no object mapping table, storage or non-storage of the object can be easily ascertained through the object identifier table 530 stored in the host device.

The host application 550 may store the object stored in the host device in the portable storage device 100. First, the host application 550 reads out the stored object (operation S401). The host application 550 may then acquire location data about a space for storing the object in the portable storage device 100 by use of the object identifier table obtained according to the method shown in the exemplary embodiment of FIG. 5 (operation S403).

The host application 550 transmits location data about the storage space, an object identifier and an object to the storage medium application 150 (operation S411). The storage medium application performs retrieves the location data of the object, through the object mapping table 140 and using the transmitted location data of the object (operation S422). As a result, when the object location data is valid, the storage medium application 150 directly stores the object and the object identifier in the concerned object location data field of the object table without searching the object table (operation S431). The storage medium application 150 modifies the object location data of the object mapping table 140 in order to represent that the object is stored in the concerned portion (operation S442), and optionally transmits the results of the storage and modification to the host application 550 (operation S451).

Operations 5422 and 5443 may be omitted when the object mapping table 140 is not used in the storage process.

Figure 9:
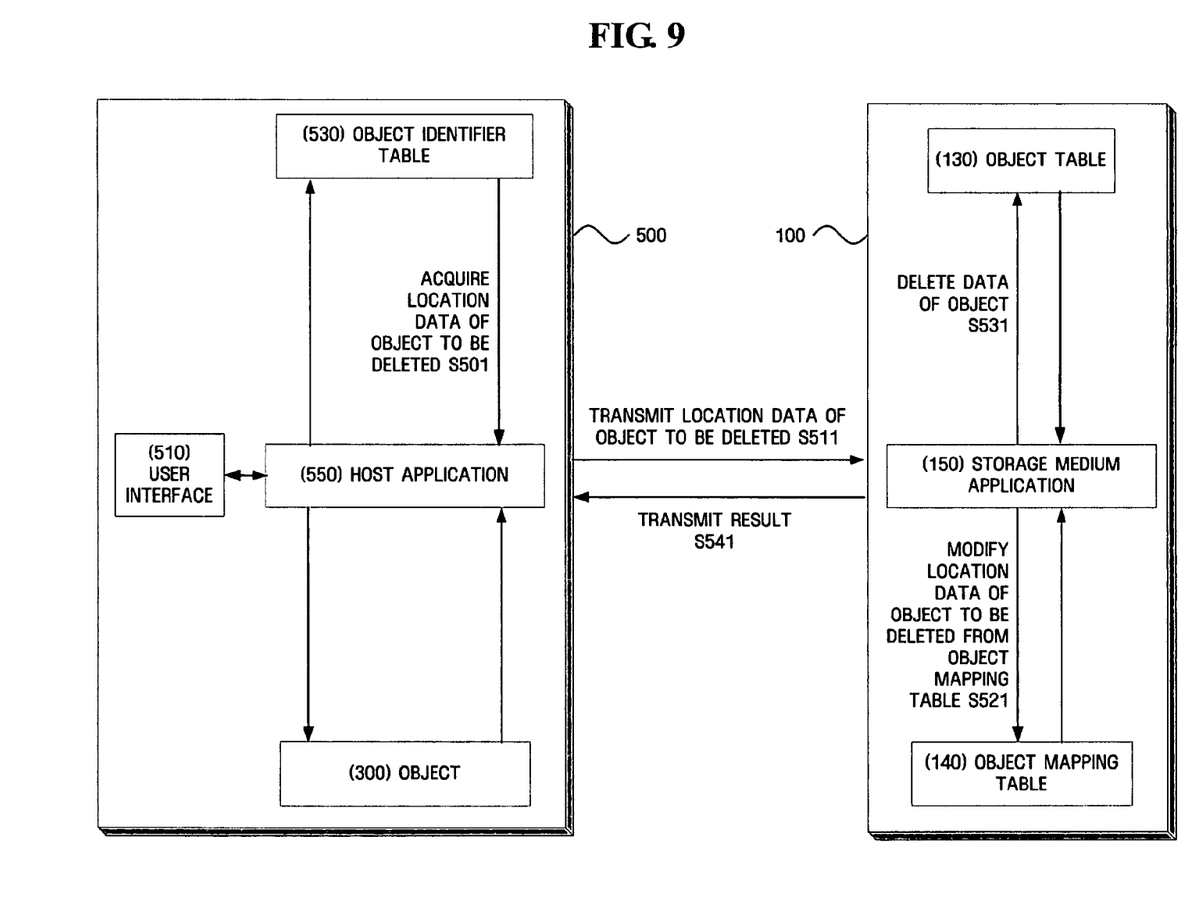
FIG. 9 is a block diagram illustrating deletion by a host device of an object from a portable storage device storing the object therein.

FIG. 9 is a block diagram illustrating deletion by the host device of the object stored in the portable storage device according to an exemplary embodiment of the present invention.

The portable storage device 100 stores, changes and uses the object mapping table 140. When storing the object, the state data of the object currently in use can be easily ascertained by retrieving the data stored in the object mapping table 140. Even when there is no object mapping table, storage or non-storage of the object can be easily ascertained through the object identifier table 530 stored in the host device.

The host application 550 may store the object stored in the host device in the portable storage device 100. The host application 550 may acquire location data of the object to be deleted, by use of the object identifier table obtained through the method of the exemplary embodiment of FIG. 5 (operation S501). The host application transmits the location data of the object to be deleted to the storage medium application 150 (operation S511). The storage medium application 150 modifies data of the object mapping table 140 by use of the object location data (operation S521). This is to represent that the object has been deleted without having to search the object table when an operation to read out or modify the deleted object is later requested. The host application directly deletes the concerned object and the object identifier without searching the object table (operation S531). The result of deletion is optionally transmitted to the host application 550 (operation S541).

When the object mapping table 140 is not used in the storage process, operation 5521 may be omitted.

Figure 10:
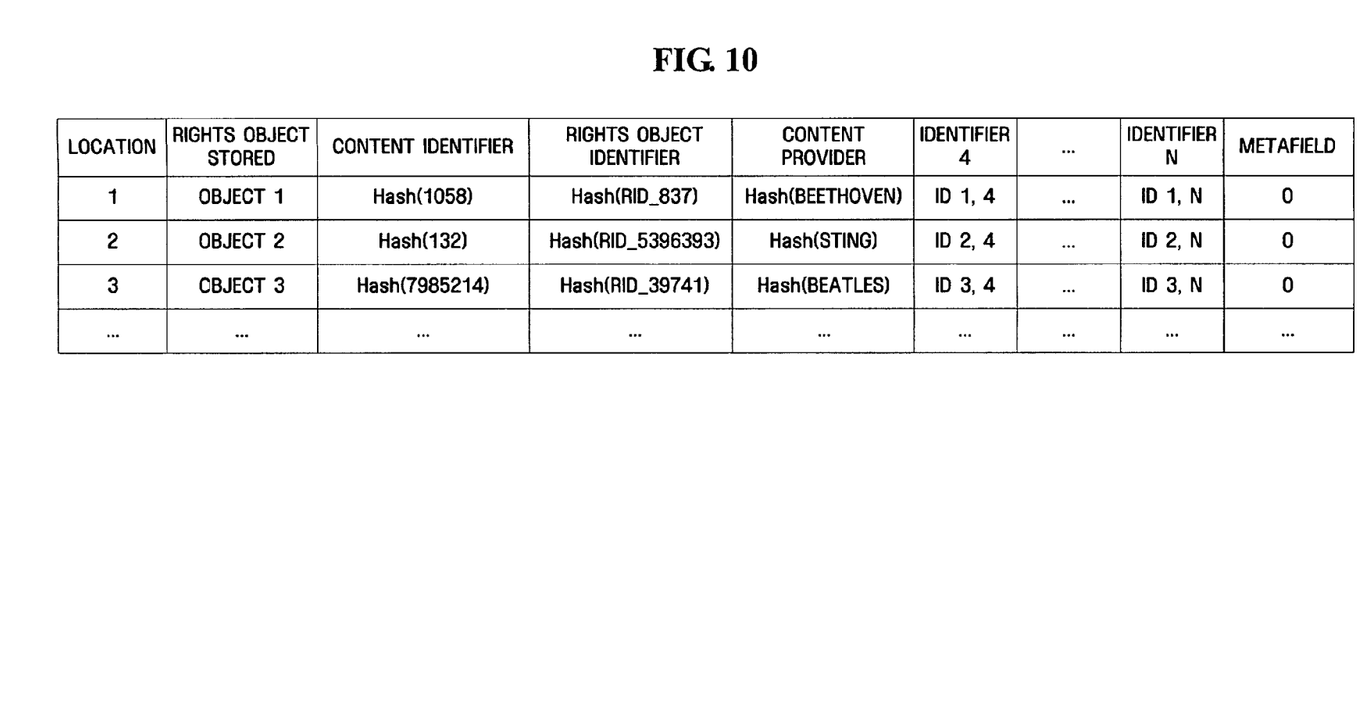
FIG. 10 is a table illustrating an exemplary embodiment of objects and object identifiers stored in an object table.

FIG. 10 is a table illustrating an exemplary embodiment of the object and object identifier stored in the object table. In FIG. 10, identifiers are obtained using a cryptographic hash function, and then stored.

Objects are stored in the object table. The object may be a single rights object or a part of a divided rights object. For storing objects in the object table, a fixed length thereof is required. If the rights object is longer than the fixed length, the rights object is divided and then stored as divided. This implies that the table can be consecutively stored within a storage medium.

There may be various identifiers for searching for objects. In the object table shown in FIG. 10, a content identifier, a rights object identifier and a content provider are used as the object identifiers. For locating a rights object, a search may be performed by using the content identifier stored in the host device or by using the rights object identifier. Otherwise, the search may be performed by using the name of a composer or singer. The above mentioned object identifiers may have various lengths. However, the identifiers having various lengths may make it difficult to estimate an accurate location of the object in the object table. Accordingly, in the exemplary embodiment of the present invention, the object identifiers are stored by using a cryptographic hash. The cryptographic hash converts random data A into a hash value B having a predetermined length. At this time, the random data A cannot be analogized by using the hash value B. Also, it is impossible to obtain other data C that is different from the random data A and that converts into the same hash value B by knowing only the random data A and the hash value B. SHA1, MD4, or MD5 may be used as the cryptographic hash.

For example, content identifiers of an object 1, an object 2 and an object 3 may respectively be 1058, 132 and 7985214. However, the lengths of object 1, object 2 and object 3 may be fixed if they are stored having the same length using the cryptographic hash. Likewise, this will apply to rights object identifiers and content providers.

If the host device and the portable storage device include identical hash units, a hash value of an identifier to be located in the host device is obtained through the hash unit and location data of an object can be obtained by searching the object identifier table stored in the host device.

Also, the object table includes empty object identifier fields to allow the host device to use the empty object identifier fields, thereby generating new object identifiers. For example, FIG. 10 represents three identifier fields stored therein but other identifier fields are emptied because it is not decided which identifiers will be used. The empty identifier fields may be stored in the object table after the identifiers are newly established in the application of the host device.

According to the present invention, the speed of using an object may be increased by the ability to rapidly search for the object stored in a portable storage device.

Further, the location of an object in the portable storage device may be obtained using identifier data of the object.

While the present invention has been described with respect to certain exemplary embodiments, it will be apparent to those skilled in the art that various changes and modifications may be made without departing from the spirit and scope of the invention as defined in the following claims. Considering this, it should be noted that the exemplary embodiments described herein are merely examples, and the present invention shall not be limited thereto. The protection scope of the present invention shall be defined by the accompanying claims rather than by the detailed description. Further, it should be understood that the implication and scope of the claims is such that any modification or modified types of the invention derived from the equivalent concept thereof are all included in the scope of the present invention.

What is claimed is:

1. A method for searching a portable storage device for a rights object by using an object identifier of the rights object, the method comprising:
   accessing the portable storage device from a host device;
   retrieving the object identifier of the rights object stored in the portable storage device;
   storing at the host device the object identifier which is retrieved;
   searching by the host for the object identifier which is stored to perform an operation associated with the rights object stored in the portable storage device; and
   acquiring location data of the rights object as a result of the searching;
   obtaining object data in the portable storage device based on the acquired location data;
   wherein the obtaining the object data in the portable storage device is performed directly without searching, and
   wherein the rights object comprises copyright information including rights to play, display, execute, print, export, or peruse digital content.

2. The method of claim 1, wherein the object identifier is produced by a hash function.

3. The method of claim 1, wherein the searching includes searching for identifier data of the rights object to be searched for with a value produced by a hash function.

4. The method of claim 1, wherein the retrieving includes receiving location data of the rights object indicated by the object identifier.

5. The method of claim 1, wherein the object identifier includes one of identification data of content associated with the rights object, identification data associated with use of the rights object and identification data of a subject that generated the rights object.

6. The method of claim 1, wherein the storing includes storing the object identifier in a table format.

7. The method of claim 1, further comprising sharing a session key by performing mutual authentication with the portable storage device after the accessing the portable storage device,
   wherein data transmitted to and received from the portable storage device is encrypted by the session key.

8. The method of claim 1, wherein the rights object has rights data associated with a content or is a part of a plurality of parts of the rights object.

9. The method according to claim 1, wherein the storing at the host device comprises storing the object identifier in an object data storing unit.

10. The method according to claim 9, wherein the location data represents a location in the object data storing unit where the rights object is stored.

11. A method for searching for a rights object in a portable storage device by using an object identifier, the method comprising:
    accessing a host device from a portable storage device;
    transmitting an object identifier of a rights object stored in a storage unit of the portable device to the host device;
    receiving location data of the rights object and operation data of the rights object from the host device; and
    accessing a storage unit of the host device storing therein the rights object and object data by use of the location data of the rights object;
    obtaining the object data in the portable storage device based on the received location data;
    wherein the obtaining the object data in the portable storage device is performed directly without searching, and
    wherein the rights object comprises copyright information including rights to play, display, execute, print, export, or peruse digital content.

12. The method of claim 11, wherein the storage unit of the host device comprises an object data storing unit which stores objects and object identifiers.

13. The method of claim 11, wherein the storage unit comprises an object data storing unit formed in a table format.

14. The method of claim 11, wherein the accessing of the storage unit of the includes updating the rights object, if an operation to be performed is to update the rights object.

15. The method of claim 11, wherein the accessing the storage unit of the host device including modifying the object mapping data stored in the storage unit, where an operation to be performed related to the rights object is either to store the rights object in or delete the rights object from the storage unit of the host device.

16. The method of claim 11, wherein the object identifier is a value produced by a hash function.

17. The method of claim 11, wherein the object identifier includes one of identification data of content related to the rights object, identification data related to use of the rights object and identification data of a subject generating the rights object.

18. The method of claim 11, further comprising sharing a session key by performing mutual authentication with the host device after the accessing the host device, wherein data transmitted to and received from the portable storage device is encrypted by the session key.

19. The method of claim 11, wherein the rights object has rights data associated with a content or is a part of a plurality of parts of the rights object.

20. An apparatus for searching for a rights object in a portable storage device by using an identifier of the rights object in a host device, the apparatus comprising:
- an object identifier storing unit which stores object identifiers therein; and
- an application unit which retrieves an object identifier from the portable storage unit and stores the object identifier in the object identifier storing unit,
- wherein the application unit searches for the object identifier stored in the object identifier storing unit and acquires location data of a rights object to perform an operation with respect to the rights object stored in the portable storage device;
- wherein object data in the portable storage device is obtained based on the acquired location data, and the object data is obtained directly without searching and
- wherein the rights object comprises copyright information including rights to play, display, execute, print, export, or peruse digital content.

21. The apparatus of claim 20, wherein the object identifier is produced by a hash function.

22. The apparatus of claim 21, wherein the application unit searches for identification data of the object based on the object identifier produced by the hash function.

23. The apparatus of claim 20, wherein the application unit receives location data of the rights object indicated by the object identifier.

24. The apparatus of claim 20, wherein the object identifier includes one of identification data of content related to the object, identification data related to use of the rights object and identification data of a subject generating the rights object.

25. The apparatus of claim 20, wherein the application unit stores the object identifier in a table format.

26. The apparatus of claim 20, further comprising an authentication unit which is connected to the portable storage device, performs mutual authentication with the portable storage device, and shares a session key,
- wherein data transmitted to and received from the portable storage device is encrypted by the session key.

27. The apparatus of claim 20, wherein the rights object has rights data associated with the content, or is a part of a plurality of parts of the rights object.

28. A portable storage device comprising,
- an object data storing unit which stores objects and object identifiers therein;
- an application unit which transmits an object identifier to a host device and receives location data of a rights object and operation data associated with the rights object from the host device,
- wherein the application unit directly accesses object data in the object data storing unit using the location data of the rights object and performs an operation associated with the rights object;
- wherein the application unit accesses the object data in the object data storing unit directly without searching, and
- wherein the rights object comprises copyright information including rights to play, display, execute, print, export, or peruse digital content.

29. The portable storage device of claim 28, wherein the object data storing unit is a table.

30. The portable storage device of claim 28, wherein the application unit leaves the updating of the rights object to the object data storing unit, where the operation to be performed is to update the rights object.

31. The portable storage device of claim 28, further comprising an object mapping data storing unit which stores state data of the rights object stored in the object data storing unit, where an operation to be performed is to store or delete the rights object in the object data storing unit,
- wherein the application unit modifies the data stored the object mapping data storing unit.

32. The portable storage device of claim 28, wherein the object identifier is produced by a hash function.

33. The portable storage device of claim 28, wherein the object identifier includes one of identification data of content related to the rights object, identification data related to use of the rights object and identification data of a subject generating the rights object.

34. The portable storage device of claim 28, further comprising an authentication unit which performs mutual authentication with the host device by accessing the host device, and shares a session key,
- wherein data transmitted to and received from the host device is encrypted by the session key.

35. The portable storage device of claim 28, wherein the rights object includes information about content rights, or is a part of a plurality of parts of the rights object.

* * * * *